United States Patent
Raja et al.

(10) Patent No.: US 11,977,738 B2
(45) Date of Patent: May 7, 2024

(54) ALLOCATION OF STORE REQUESTS

(71) Applicant: Arm Limited, Cambridge (GB)

(72) Inventors: Abhishek Raja, Austin, TX (US);
Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 66 days.

(21) Appl. No.: 17/903,293

(22) Filed: Sep. 6, 2022

(65) Prior Publication Data

US 2024/0078012 A1    Mar. 7, 2024

(51) Int. Cl.
  *G06F 12/00*    (2006.01)
  *G06F 3/06*     (2006.01)
(52) U.S. Cl.
  CPC .......... *G06F 3/0611* (2013.01); *G06F 3/0656* (2013.01); *G06F 3/0673* (2013.01)
(58) Field of Classification Search
  CPC .................................................. G06F 3/0656
  See application file for complete search history.

(56) References Cited

U.S. PATENT DOCUMENTS

| | | | | |
|---|---|---|---|---|
| 6,260,115 | B1* | 7/2001 | Permut | G06F 12/0862 |
| | | | | 711/134 |
| 10,754,782 | B1* | 8/2020 | Pham | G06F 12/0831 |
| 2010/0268894 | A1* | 10/2010 | Kadambi | G06F 9/3455 |
| | | | | 711/137 |
| 2010/0293347 | A1* | 11/2010 | Luttrell | G06F 9/3834 |
| | | | | 711/170 |
| 2017/0041394 | A1* | 2/2017 | Mortazavi | G06F 3/0631 |
| 2018/0150399 | A1* | 5/2018 | Shindo | G06F 12/0864 |
| 2021/0165732 | A1* | 6/2021 | Luo | G06F 12/0207 |

* cited by examiner

*Primary Examiner* — John A Lane
(74) *Attorney, Agent, or Firm* — NIXON & VANDERHYE P.C.

(57) ABSTRACT

There is provided an apparatus, method and medium. The apparatus comprises a store buffer to store a plurality of store requests, where each of the plurality of store requests identifies a storage address and a data item to be transferred to storage beginning at the storage address, where the data item comprises a predetermined number of bytes. The apparatus is responsive to a memory access instruction indicating a store operation specifying storage of N data items, to determine an address allocation order of N consecutive store requests based on a copy direction hint indicative of whether the memory access instruction is one of a sequence of memory access instructions each identifying one of a sequence of sequentially decreasing addresses, and to allocate the N consecutive store requests to the store buffer in the address allocation order.

20 Claims, 12 Drawing Sheets

US 11,977,738 B2

ALLOCATION OF STORE REQUESTS

TECHNICAL FIELD

The present invention relates to data processing. More particularly the present invention relates to an apparatus, a method and a non-transitory computer readable storage medium to store computer-readable code for fabrication of an apparatus.

BACKGROUND

Some data processing apparatuses are provided with store buffers to store a plurality of store requests each identifying a storage address and a data item comprising a predetermined number of bytes that is to be transferred to storage beginning at the storage address.

SUMMARY

According to a first example configuration there is provided an apparatus comprising:
a store buffer configured to store a plurality of store requests, each of the plurality of store requests identifying a storage address and a data item to be transferred to storage beginning at the storage address, wherein the data item comprises a predetermined number of bytes;
frontend circuitry responsive to a memory access instruction indicating a store operation specifying storage of N data items, to generate control signals;
allocation circuitry, responsive to the control signals, to determine an address allocation order of N consecutive store requests in the store buffer based on a copy direction hint indicative of whether the memory access instruction is one of a sequence of memory access instructions each indicating a corresponding store operation identifying one of a sequence of sequentially decreasing addresses, and to allocate the N consecutive store requests to the store buffer in the address allocation order, wherein each of the N consecutive store requests is indicative of one of the N data items.

According to a second example configuration there is provided a method of operating an apparatus comprising a store buffer to store a plurality of store requests, each of the plurality of store requests identifying a storage address and a data item to be transferred for storage beginning at the storage address, wherein the data item comprises a predetermined number of bytes, the method comprising:
decoding a memory access instruction indicating a store operation specifying storage of N data items, to generate control signals;
determining, in response to the control signals, an address allocation order of N consecutive store requests in the store buffer based on a copy direction hint indicative of whether the memory access instruction is one of a sequence of memory access instructions each identifying one of a sequence of sequentially decreasing addresses; and
allocating the N consecutive store requests to the store buffer in the address allocation order, wherein each of the N consecutive store request is indicative of one of the N data items.

According to a first example configuration there is provided a non-transitory computer readable storage medium to store computer-readable code for fabrication of an apparatus comprising:
a store buffer configured to store a plurality of store requests, each of the plurality of store requests identifying a storage address and a data item to be transferred for storage beginning at the storage address, wherein the data item comprises a predetermined number of bytes;
frontend circuitry responsive to a memory access instruction indicating a store operation specifying storage of N data items, to generate control signals;
allocation circuitry, responsive to the control signals, to determine an address allocation order of N consecutive store requests in the store buffer based on a copy direction hint indicative of whether the memory access instruction is one of a sequence of memory access instructions each identifying one of a sequence of sequentially decreasing addresses, and to allocate the N consecutive store requests to the store buffer in the address allocation order, wherein each of the N consecutive store request is indicative of one of the N data items.

BRIEF DESCRIPTION OF THE DRAWINGS

The present invention will be described further, by way of example only, with reference to configurations thereof as illustrated in the accompanying drawings, in which:

FIG. 5c schematically illustrates a direction of changes in memory access associated with the store requests illustrated in FIG. 5a;

FIG. 6c schematically illustrates a direction of changes in memory access associated with the store requests illustrated in FIG. 6a;

DESCRIPTION OF EXAMPLE CONFIGURATIONS

Figure 1:
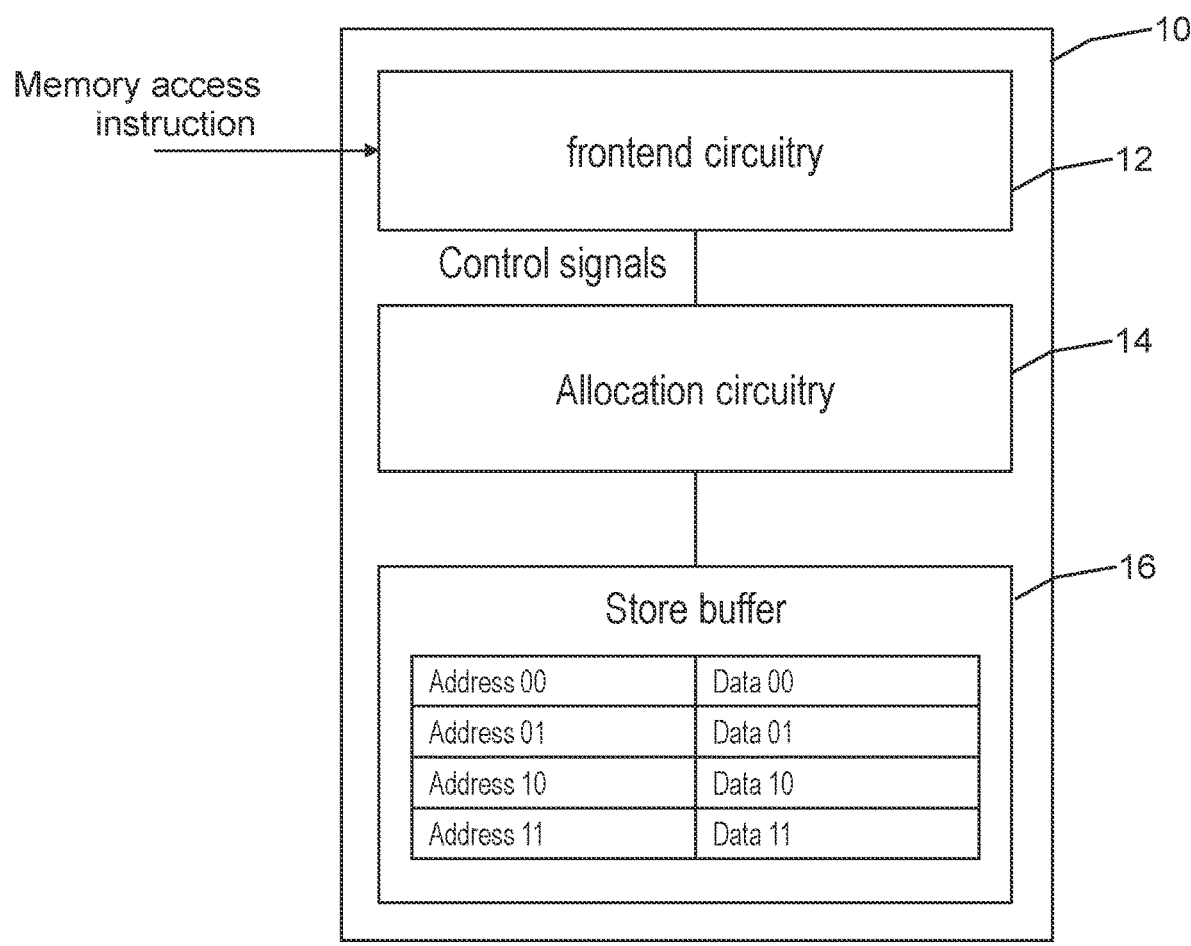
FIG. 1 schematically illustrates a data processing apparatus according to various configurations of the present techniques.

Before discussing the configurations with reference to the accompanying figures, the following description of configurations is provided.

In accordance with one example configuration there is provided an apparatus comprising a store buffer that is configured to store a plurality of store requests. Each of the plurality of store requests identifies a storage address and a data item to be transferred to storage beginning at the storage address, where the data item comprises a predetermined number of bytes. The apparatus is also provided with frontend circuitry that is responsive to a memory access instruction indicating a store operation specifying storage of N data items, to generate control signals, and allocation circuitry that is responsive to the control signals, to determine an address allocation order of N consecutive store requests in the store buffer based on a copy direction hint indicative of whether the memory access instruction is one of a sequence of memory access instructions each indicating a corresponding store operation identifying one of a sequence of sequentially decreasing addresses. The allocation circuitry is also arranged to allocate the N consecutive store requests to the store buffer in the address allocation order, wherein each of the N consecutive store requests is indicative of one of the N data items.

The store requests (store buffer entries) of the store buffer identify the data item that is to be stored and a storage address. The storage address and the data item may be stored together or in separate portions of the store buffer with the storage address comprising stored in association with a field identifying a storage location of the data item. The storage buffer is provided with storage of a predefined size (predetermined number of bytes) for each of the data items. The predefined number of bytes of the data item may be sufficient to span plural minimum addressable units in the storage and may be a predefined integer number of bytes or a predefined non-integer number of bytes. The storage address therefore defines a starting address of a contiguous region of storage to which the data item is to be stored that begins at the starting address and spans a region of storage having size that is equal to the predefined number of bytes. The apparatus may be required to be responsive to a range of different memory access operations. In particular, a user may want to specify a memory access operation that corresponds to a greater amount of data than the predetermined number of bytes. For this reason, the apparatus is responsive to a memory access instruction that specifies storage of N data items where N is a positive integer greater than 1. The memory access instruction is a single instruction that forms part of an instruction set architecture (ISA). The ISA is a complete set of instructions that can be interpreted by the apparatus and provides an interface between code that is defined by a programmer or a compiler and the circuitry that performs the processing operations. In order to interpret the instructions of the instruction set architecture, the apparatus is provided with front end circuitry (which may comprise decoder circuitry) that is arranged to identify instructions from the ISA and to generate control signals that cause different functional units of the processing circuitry to perform defined operations. The apparatus is provided with frontend circuitry that is responsive to the memory access instruction to generate control signals. The control signals are interpreted by allocation circuitry which is arranged to allocate each of the N data items (with a corresponding set of N storage addresses) into the store buffer in anticipation of them being transferred to storage at the N storage addresses. The single memory access instruction is "late cracked", i.e., it is split into N store operations at a late stage in the processing circuitry after the instruction has been interpreted (decoded) by the frontend circuitry.

In some cases, a programmer or compiler may require that the memory access instruction is one of a sequence of memory access instructions. This could be the case, for example, if a large set of data were being moved, copied, or stored. The inventors have realised that the efficiency with which the data items are stored can be dependent on an order in which the N data items are allocated to the storage buffer. In particular, for apparatuses that allocate the N data items to the storage buffer in an order of increasing address and when the sequence of memory access instructions identify a sequence of increasing addresses then the memory instructions specifying storage of N data items will naturally result in the data items associated with the sequence of memory access instructions being allocated to the storage buffer in an order of monotonically increasing addresses. On the other hand, for apparatuses that allocate the N data items to the storage buffer in an order of increasing address and when the sequence of memory access instructions identify a sequence of decreasing addresses then the memory instructions specifying storage of N data items will not result in a sequence of monotonically decreasing addresses or of monotonically increasing addresses. Therefore, a sequence of memory access operations specifying a sequence of sequentially decreasing memory accesses will result in a storage buffer allocation in which the storage addresses globally decrease (as a result of the sequence of memory access operations) but that locally increase (as a result of the allocation order associated with the N data items specified in each memory access operation). The inventors have realised that the resulting non-monotonic sequence of items in the storage buffer results in inefficiencies when transferring the data items to storage. The allocation circuitry (which may comprise a load/store unit and/or a rename unit) is arranged to be responsive to a copy direction hint that is indicative of whether the sequence of memory instructions corresponds to a sequence of sequentially decreasing addresses, to determine the address allocation order based on this copy direction hint. In other words, when the copy direction hint indicates that the corresponding store operation does not identify one of a sequence of sequentially decreasing addresses, one allocation order is used for each of the N data items. On the other hand, when the copy direction hint indicates that the corresponding store operation does identify one of a sequence of sequentially decreasing addresses, a different allocation order for the N data items is used. As a result, the allocation circuitry is able to take into account an indication of a global variation of the storage addresses when determining the local allocation of each of the N data items and in this way is able to achieve an allocation order that reduces the inefficiencies associated with transferring the data items to storage. The frontend circuitry, the allocation circuitry and the store buffer may be provided as discrete circuit units. Alternatively, the frontend circuitry, the allocation circuitry and the store buffer may be provided as one or more blocks of circuitry that together provide the function of the frontend circuitry, the allocation circuitry, and the store buffer.

In some configurations, when the copy direction hint indicates that the memory access instruction is one of the sequence of memory access instructions each specifying one of the sequence of sequentially decreasing addresses, the address allocation order is monotonically decreasing. As a result, the order in which allocated items appear in the store buffer is both locally decreasing such that the N sequential addresses associated with the N data items are monotonically decreasing and globally decreasing such that the store requests allocated to the store buffer that are associated with the sequence of sequentially decreasing addresses are also monotonically decreasing.

In some configurations, when the copy direction hint indicates that the memory access instruction is not one of the sequence of memory access instructions each specifying one of the sequence of sequentially decreasing addresses, the address allocation order is monotonically increasing. Where the sequence of memory access instructions each specify a sequence of sequentially increasing addresses, then the order in which the allocated items appear in the store buffer will also be monotonically increasing.

There are various mechanisms by which the copy direction hint can be provided to the allocation circuitry. In some configurations the copy direction hint is included in the memory access instruction. This approach provides a programmer or a compiler generating the code with the flexibility to specify the copy direction hint. The copy direction hint may be explicitly specified as an immediate value within the instruction. Alternatively, the copy direction hint may be implicitly specified, for example, through the definition of at least two different memory access instructions where one of the memory access instructions implicitly encodes a copy direction hint indicating that the memory access instruction is one of a sequence of memory access instructions each indicating a corresponding store operation identifying one of a sequence of sequentially decreasing addresses. In this way, the programmer/compiler can choose to use the memory access instruction that implicitly encodes the copy direction hint when the memory access instruction is one memory access instructions specifying the sequence of sequentially decreasing addresses and can choose to use the memory access instruction that does not encode the hint when the sequence is not sequentially decreasing.

In some configurations the apparatus comprises hint flag storage configured to store the copy direction hint; the frontend circuitry is responsive to a hint instruction encoding information indicative of a specified copy direction hint to generate hint update control signals; and the allocation circuitry is responsive to the hint update control signals to update the hint flag storage to the specified copy direction hint. The hint instruction is an instruction of the instruction set architecture and is interpreted by the frontend circuitry (for example, decoder circuitry that forms part of the frontend circuitry) in order to update the copy hint direction in the hint flag storage. The allocation circuitry is then responsive to the memory access instruction to determine the copy direction hint by reading from the hint flag storage. The provision of the hint instruction therefore provides a mechanism for setting the copy direction hint. In some configurations, the copy hint direction stored in the hint flag storage is interpreted, by the allocation circuitry, as a default copy hint direction which can be overridden by a copy hint direction which could, as already discussed, be encoded in the memory access instruction.

In some configurations the apparatus comprises hint flag storage configured to store the copy direction hint; and the apparatus comprises predictor circuitry configured to update the copy direction hint based on one or more properties of the sequence of memory access instructions. The predictor circuitry may form part of the frontend circuitry or may be provided as a discreet logic block that interacts with the frontend circuitry. The predictor circuitry is arranged to monitor (analyse or otherwise observe) the sequence of memory instructions to determine properties of that sequence and to identify from those properties, whether or not the copy direction hint should be updated based on those monitored properties.

The one or more properties can be any property that is indicative of a direction of the sequence of memory instructions. In some configurations, the frontend circuitry is responsive to a plurality of types of memory access instruction; and the predictor circuitry is configured to maintain, as the one or more properties of the sequence of memory access instructions an observed distribution of at least one of the plurality of types of memory access instructions. For example, a programmer may specify a high level instruction (for example, a memory instruction) indicating that a relatively large region of memory (larger than the predetermined number of bytes) is to be moved/copied. Such a copy/move may be a forward copy/move, starting at a sequentially lowest address and working through the addresses in an increasing order, or it may be a backwards copy/move, starting at a sequentially highest address and working through the addresses in a decreasing order (such alternatives may be provided, for example, to facilitate a move of data from a starting region of address space to an overlapping destination region of address space). The compiler may break such an instruction down into a large number of individual memory access instructions. The type of the memory access instructions that are used may be dependent on whether the high level instruction specifies a forward or a reverse copy. In this case, the predictor circuitry may maintain information indicative of a history of the types of memory access instructions that are used.

In some configurations, the plurality of types of memory access instruction are suitable for performing an iterated sequence of memory accesses to a contiguous region of memory; the plurality of types of memory access instruction comprise a loop body memory access instruction arranged to access a complete region of the N data blocks, and an epilogue memory access instruction arranged to access an incomplete region of the N data blocks; and the allocation circuitry is configured to maintain, as the observed distribution, epilogue memory access information indicative of occurrences of the epilogue memory access instruction. When considering a general memory access, the data that is being moved/copied/stored may be any portion of data within the memory. When a size of this data is the predetermined number of bytes, the memory access instruction may be a single instruction. However, in the more general case, plural memory access instructions may be required. Typically, memory accesses that involve storing data that is aligned with an alignment boundary may require fewer instruction cycles that memory accesses storing data that is misaligned. Furthermore, memory accesses storing a fixed number of bytes (for example, a whole cache line) may also require fewer instruction cycles than instructions which are storing, for example, less than the whole cache line. Therefore, in order to facilitate the general case whilst benefiting from the reduced instruction cycles required for some cases, plural types of memory access instruction may be provided. For a forward memory access involving sequentially increasing addresses, an iterated sequence of memory access instructions may typically involve an unaligned memory access that is used to perform an initial store operation to align subsequent store instructions to an alignment boundary, followed by a plurality of loop body memory access instructions (each aligned to an alignment boundary and each corresponding to a fixed number of bytes), followed by a single epilogue memory access instruction. In contrast, a backward memory access sequence may typically be broken down into an alternating sequence of loop body memory access instructions and epilogue memory access instructions. Hence, by maintaining a distribution or count of epilogue memory accesses the prediction circuitry is able to determine whether it is likely that an observed sequence of memory accesses corresponds to a backwards memory access sequence.

In some configurations the allocation circuitry is responsive to the epilogue memory access information indicating that the occurrences of the epilogue memory access instruction has reached a predetermined threshold, to modify the copy direction hint to indicate that the memory access instruction is one of the sequence of memory access instructions each identifying one of the sequence of sequentially decreasing addresses. The allocation circuitry may maintain a counter indicative of the number of occurrences of the epilogue memory access instruction. The counter may be a saturating counter. The predetermined threshold may be provided in a register or as a hardwired threshold. This approach provides a particularly efficient way of maintaining the copy direction hint.

In some configurations, the allocation circuitry is responsive to a break in the consecutive sequence of memory access instructions, to modify the copy direction hint to indicate that the memory access instruction is not one of the sequence of memory access instructions each specifying one of the sequence of sequentially decreasing addresses. A break in the sequence of memory access instructions indicates that the memory access instruction sequence is unlikely to be part of a large high level memory access instruction. Hence, by detecting that there is a break in the consecutive sequence of memory access instructions, the allocation circuitry is able to identify that the memory accesses are unlikely to correspond to a backwards high level memory access instruction.

In some configurations the apparatus comprises comprising recent store tracking storage configured to store one or more entries, each of the one or more entries indicating at least one data block to be transferred to storage in response to the plurality of store requests, wherein each of the plurality of store requests is associated with at least one of the one or more entries. Whilst the entries in the storage buffer indicate data items that are to be transferred to storage, the recent store tracking storage is arranged to indicate store requests in the store buffer that correspond to a same data block. The size of a data block is typically larger than the data items and indicates an amount of data that is transferred to storage as a single unit. This approach reduces the number of stores that are required, for example, if the store buffer contains plural data items that are addressed to a same storage block, then the recent store tracking storage may associate an entry with each of the plural data items. These entries can then all be stored at a same time rather than performing plural stores (one for each of the plural data items).

The recent store tracking entries can be associated with the store requests in a variety of ways. In some configurations, each of the plurality of store requests comprises tag information indicative of at least one associated entry of the one or more entries. In this way, the allocation circuitry is able to identify store requests of the store buffer that are each associated with a same recent store tracking entry. The tag information could take any form. For example, the tag information could comprise one or more pointers each identifying an entry of the recent store tracking storage. Each of the one or more pointers may be associated with an individual byte of the predetermined number of bytes. Alternatively, the tag information could include storage for up to two pointers, each indicating an entry of the recent store tracking storage and the allocation circuitry could be arranged to infer that, for a data item that crosses a boundary between two data blocks, a first pointer of the tag information indicates a recent store tracking entry for a data block associated with a portion of the data item that corresponds to the lower addressed data block of the two data blocks, and the second pointer of the tag information indicates a recent store tracking entry for a data block associated with a portion of the data item that corresponds to the higher addressed data block of the two data blocks.

In some configurations the allocation circuitry is configured, for a given instruction cycle and for a non-associated store request identifying a corresponding address and having tag information indicating that the corresponding address is not associated with any of the one or more entries, to allocate a new entry in the recent store tracking storage indicating a new data block corresponding to at least a portion of bytes of data identified by the corresponding address, and to modify the tag information of the non-associated store request to associate the non-associated store request with the new entry. As the data items of the store request may correspond to any address, there is not necessarily a one to one, or even a many to one, correspondence between the data items and the data blocks. Hence, a single data item may be associated with plural data blocks. The allocation circuitry may be arranged to allocate new entries in the recent store tracking storage once per cycle.

In some configurations the allocation circuitry is configured, for the given instruction cycle and for a pre-existing entry of the one or more entries, to modify the tag information of each store request of the plurality of store requests having a corresponding storage address that identifies data within a same data block as the pre-existing store request to associate that store request with the pre-existing entry. In addition to being able to allocate a single entry in the recent store tracking circuitry per cycle, the allocation circuitry is arranged to link other store requests of the storage buffer to a single pre-existing (pre-allocated) entry of the recent store tracking storage per cycle. For monotonically increasing or decreasing addresses in the store buffer, this approach provides a particularly efficient mechanism grouping entries of the store buffer that correspond to the same data block.

In some configurations the allocation circuitry is configured to sequentially deallocate each entry of the one or more entries and to transfer at least one data block indicated in that entry to storage. The store buffer is deallocated in order such that the deallocated entries comprise at least the oldest entry of the store buffer that is deallocated. In some configurations, the allocation circuitry is arranged, when deallocating each entry of the one or more entries, to deallocate each store request of the plurality of store requests associated with that entry. Hence, when a data block is transferred to storage, all entries of the storage buffer that have been associated with that data block are deallocated, thereby increasing the rate at which the store buffer can be deallocated.

The storage can take any form and may comprise on chip storage or dedicated off chip storage. In some configurations the storage is a memory hierarchy. The memory hierarchy may comprise one or more levels of cache including at least one of a level 1 cache, a level 2 cache, and a system cache. In addition, the memory hierarchy may comprise off chip storage, for example, RAM.

The data block can be any size and could, for example, be defined by a data bus for transferring the data to storage. In some configurations the data block is a cache line. In other words, the size of the data block is equal to the size of a cache line and the allocation circuitry is arranged to perform transfers to and/or from storage by transferring complete cache lines.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates an apparatus 10 according to various configurations of the present techniques. The apparatus 10 is provided with frontend circuitry 12, allocation circuitry 14 and a store buffer 16. The frontend circuitry 12 is arranged to receive a sequence of instructions including a memory access instruction specifying storage of N data items. The frontend circuitry 12 is arranged to decode the store instruction to generate control signal which are used to control the allocation circuitry 14. The allocation circuitry 14 is responsive to the control signals generated by the frontend circuitry 12 to determine an address allocation order of the N data items and to allocate, for each of the N data items, a store request in the store buffer 16. Each store request in the store buffer 16 indicates an address and data items. For example, the store buffer 16 comprises: a first store request indicating address 00 and data 00 as the data item, a second store request indicating address 01 and data 01 as the data item, a third store request indicating address 10 and data 10 as the data item, and a fourth store request indicating address 11 and data 11 as the data item. The allocation circuitry determines the allocation order based on a copy direction hint that is indicative of whether the memory access instruction is one of a sequence of memory access instructions each identifying one of a sequence of sequentially decreasing addresses. Hence, in response to the control signals generated by the frontend circuitry 12, the allocation circuitry 14 allocates N consecutive store requests, each indicative of one of the N data items.

Figure 2:
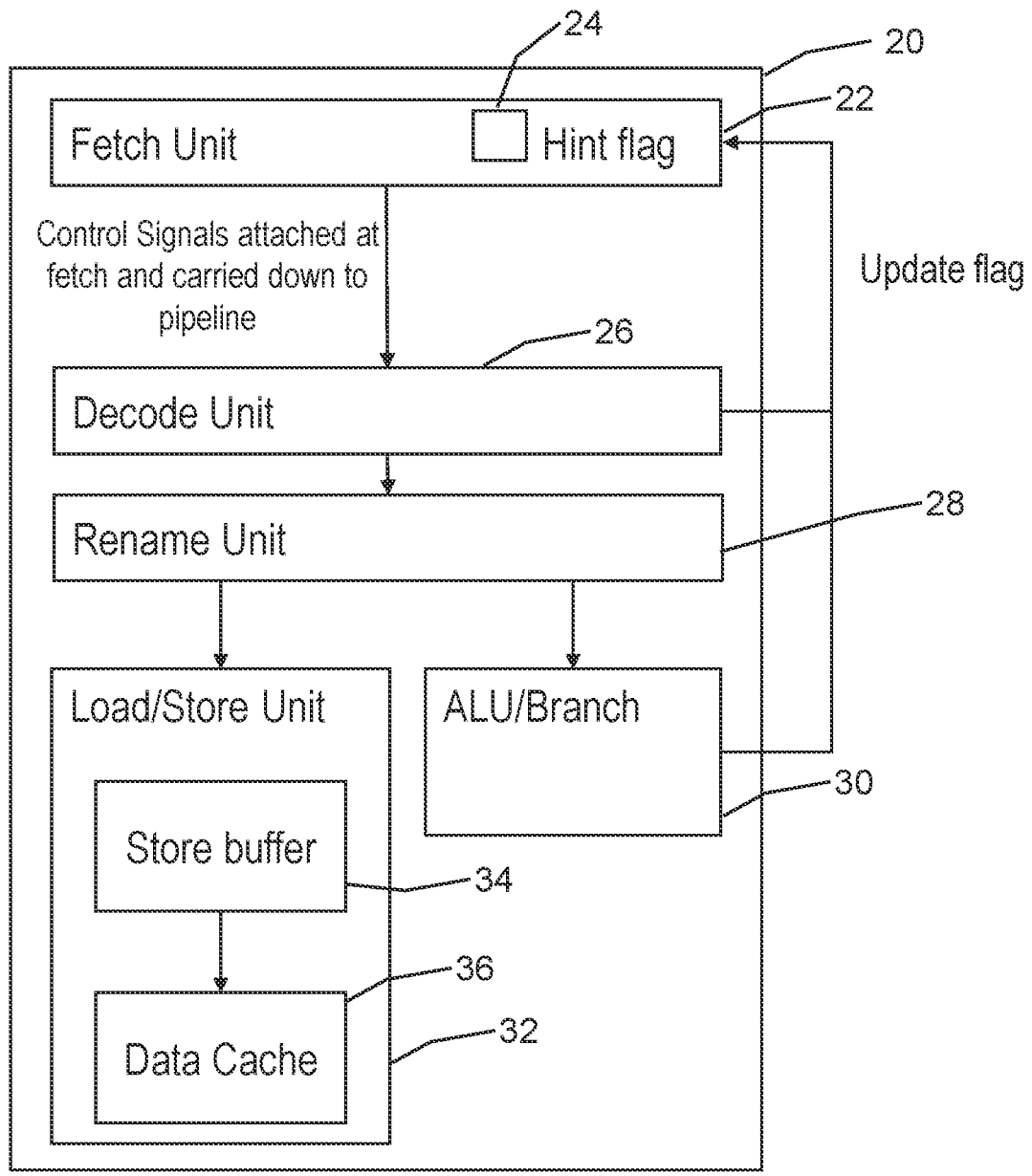
FIG. 2 schematically illustrates a data processing apparatus according to various configurations of the present techniques.

FIG. 2 schematically illustrates further details of an apparatus 20 according to various configurations of the present techniques. The apparatus is provided with a fetch unit 22 and a decode unit 26 which together form the frontend circuitry. The apparatus 20 is also provided with a rename unit 28 and a load/store unit 32 which together form allocation circuitry. The apparatus 20 is also provided with processing circuitry including the ALU (arithmetic logic unit)/branch prediction circuitry 30. In operation, the hint flag 24 may be set (modified) either directly by the fetch unit in response to observation of a distribution of different types of memory access instruction, in response to information encoded into the memory access instruction and decoded by the decode unit 26, or in response to a specific instruction indicating a specific backwards copy hint to be stored as the hint flag. The sequence of instructions may be a predicted sequence of instructions generated by the branch prediction unit 30 and may comprise a predicted loop body memory access instruction and one or more predicted epilogue memory access instructions. The fetch unit may maintain a count indicative of the number of epilogue memory access instructions that are not separated by an instruction other than a memory access instruction and when the number of epilogue memory access instructions exceeds a specified threshold, set the copy direction hint stored in the hint flag 24 to indicate that the memory access is one of a sequence of memory access instructions each identifying one of a sequence of sequentially decreasing addresses. Memory access instructions identifying N multiples of the predetermined number of bytes are late cracked into plural entries of the store buffer 34. In other words, the memory access instructions received by the decode unit 26 specify, for each single memory access instruction, N multiples of the number of bytes corresponding to N store requests (N store buffer entries within the store buffer 34). The load store unit 32, in combination with rename unit 28 identifies the data requested in the memory access instruction and allocates entries in the store buffer 34. The load/store unit 32 also groups the entries within recent store tracking storage in which store requests of the store buffer 34 are grouped into blocks, each of which is of the size of a cache line of data cache 36.

Figure 3:
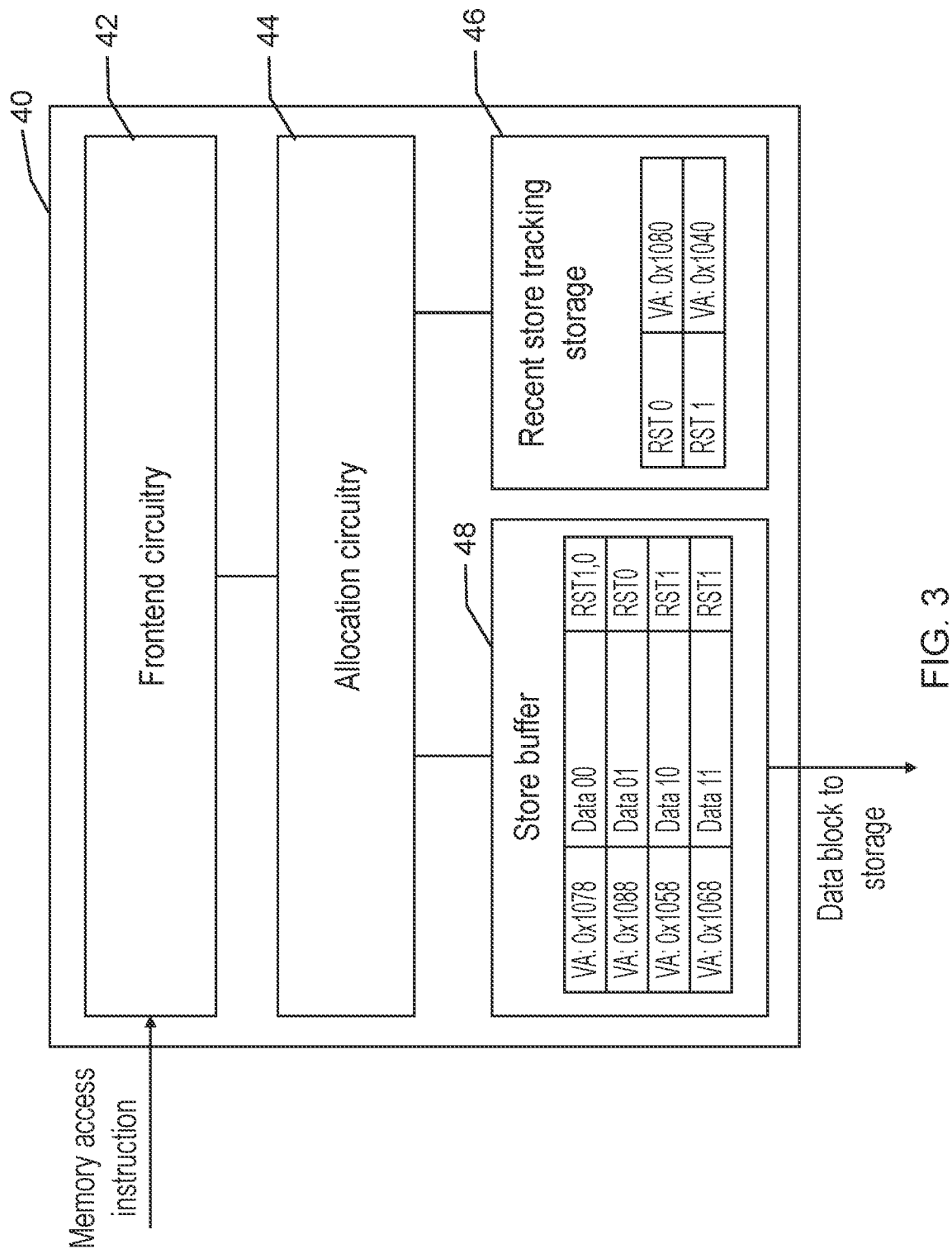
FIG. 3 schematically illustrates a data processing apparatus according to various configurations of the present techniques.

FIG. 3 schematically illustrates details of an apparatus 40 according to various configurations of the present techniques. In particular, the apparatus 40 is provided with frontend circuitry 42, allocation circuitry 44, a store buffer 48 and recent store tracking storage 46. The frontend circuitry 42 is responsive to a memory access instruction specifying N multiples of the predetermined number of bytes to allocate each of the N multiples of the predetermined number of bytes as a store request in the store buffer 48 and to group the store requests in the store buffer 48 in entries in the recent store tracking (RST) storage 46. The store requests in the store buffer 48 may each contain a virtual address indicating a location in storage at which the data is to begin, the data and tag information indicating which RST entries of the recent store tracking storage 46 the corresponding entry of the store buffer 48 is associated with. In the illustrated example the recent store tracking storage 46 comprises two entries RST 0 and RST 1. RST 0 corresponds to a cache line beginning at virtual address (VA) 0x1080 and RST 1 corresponds to a cache line beginning at virtual address VA 0x1040. In the illustrated example, the store buffer 48 contains four entries. The first store request begins at VA 0x1078 and stores Data 00. VA 0x1078 spans from VA 0x1078 to VA 0x1087 and, hence, spans cache lines VA 0x1080 associated with RST 0 and VA 0x1040 associated with RST 1. For this reason, the first store request of the store buffer 48 contains tag information indicating both RST 1 and RST 0 and the store buffer may be configured to identify that the former (RST 1) corresponds to the portion of Data 00 with addresses that fall on the lower side of the cache line boundary and to identify that the latter (RST 0) corresponds to the portion of Data 00 with addresses that fall on the higher side of the cache line boundary. Each of the remaining entries are associated with only a single RST entry. The second store request beginning at VA 0x1088 corresponds to RST entry 0. The third and fourth store requests begin at VA 0x1058 and 0x1068 respectively and correspond to RST entry 1. By grouping the store requests in the store buffer 48 in this way, the allocation circuitry 48 is able to trigger the deallocation of plural entries of the store buffer 48 corresponding to a same cache line (as indicated in the recent store tracking storage 46) by issuing a same memory operation to transfer the identified cache line to storage.

Figure 4:
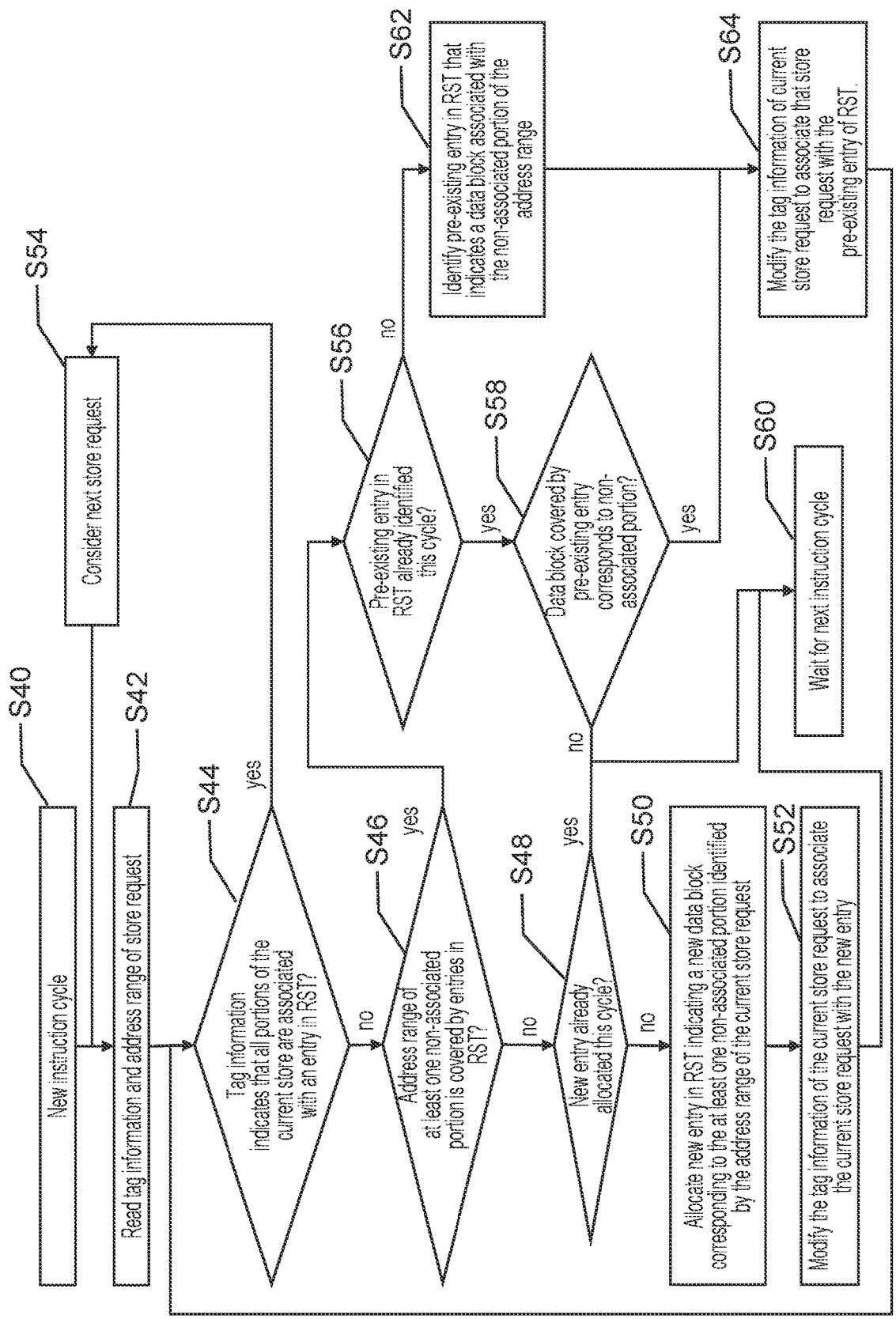
FIG. 4 schematically illustrates a sequence of steps taken by a data processing apparatus according to various configurations of the present techniques.

FIG. 4 schematically illustrates a sequence of steps that are carried out by the allocation circuitry to populate the recent store tracking (RST) storage. Flow begins at step S40 where it is determined if a new instruction cycle has begun. If so then flow proceeds to step S42. At step S42 the allocation circuitry reads tag information and an address range of a store request. Flow then proceeds to step S44 where it is determined whether the tag information indicates that all portions of the current store are already associated with one or more entries in the RST storage. If yes, then flow proceeds to step S54 where a next store request is considered as the "current store request" before flow returns to step S42. If, at step S44, it was determined that the tag information does not indicate that all portions of the current store are already associated with an entry in the RST, then flow proceeds to step S46. At step S46 it is determined whether an address range of at least one non-associated portion of the current store is covered by entries that are already present in the RST storage. If, at step S46, it is determined that at least one non-associated address range is already covered by entries in the RST, then flow proceeds to step S56. At step S56, it is determined whether a pre-existing entry in the RST storage has already been identified during this cycle. If yes, then the flow proceeds to step S58 where it is determined whether the data block covered by the pre-existing entry corresponds to a non-associated portion of the current store. If, at step S58, it is determined that the pre-existing entry does not correspond to a non-associated portion of the current store request then flow proceeds to step S60 where the allocation circuitry waits for the next instruction cycle.

If, at step S58, it was determined that the data block covered by the pre-existing entry of the RST does correspond to a non-associated portion of the current store request, then flow proceeds to step S64 where the tag information associated with the current store request is modified to associate that store request with the pre-existing entry of the RST. Flow then returns to step S44 and proceeds as described above.

If, at step S56 it was determined that no pre-existing entries in the RST have already been identified this cycle, then flow proceeds to step S62 where a pre-existing entry in the RST, indicating a data block associated with the non-associated portion of the address range is identified. Flow then proceeds to step S64 and proceeds as described above.

If, at step S46, it was determined that no entries in the RST cover any of the non-associated portions of the address range of the current store, then flow proceeds to step S48. At step S48 it is determined whether or not a new entry has been allocated to the RST this cycle. If, at step S48, it is determined that a new entry in the RST has already been allocated this cycle then flow proceeds to step S60 where the allocation circuitry waits for the next instruction cycle.

If, at step S48, it was determined that no new entries have been allocated this cycle then flow proceeds to step S50. At step S50, a new entry is allocated in the RST indicating a new data block that corresponds to at least one non-associated portion of the current store request. Flow then proceeds to step S52, where the tag information of the current store request is modified to associated the current store request with the new entry. Flow then proceeds to step S60 where the allocation circuitry waits for the next instruction cycle.

Figure 5A:
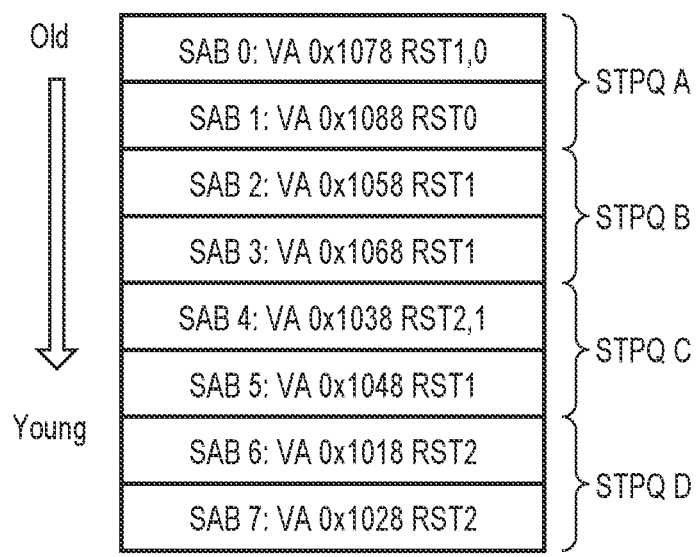
FIG. 5a schematically illustrates an ordering of store requests in a store buffer.
Figure 5B:
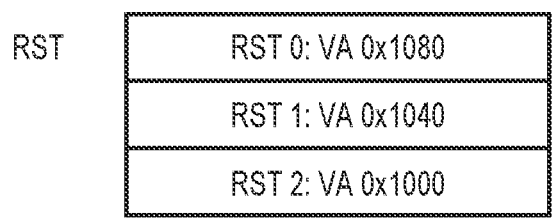
FIG. 5b schematically illustrates a set of entries in a recent store table.
Figure 5C:
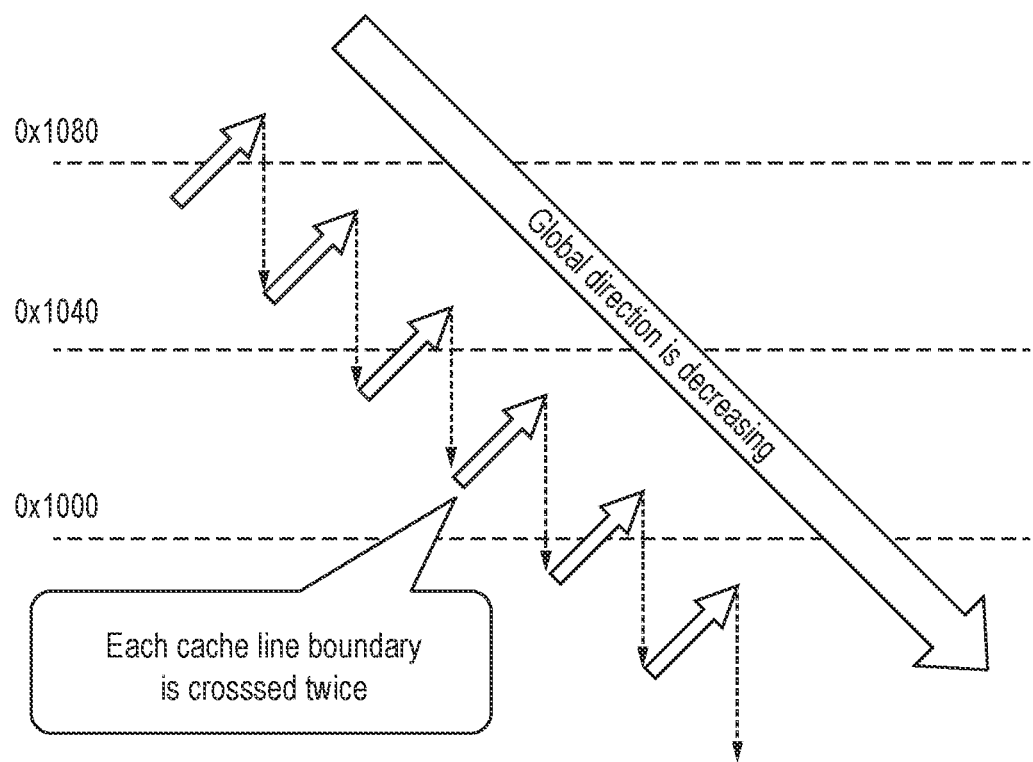
Figure 6A:
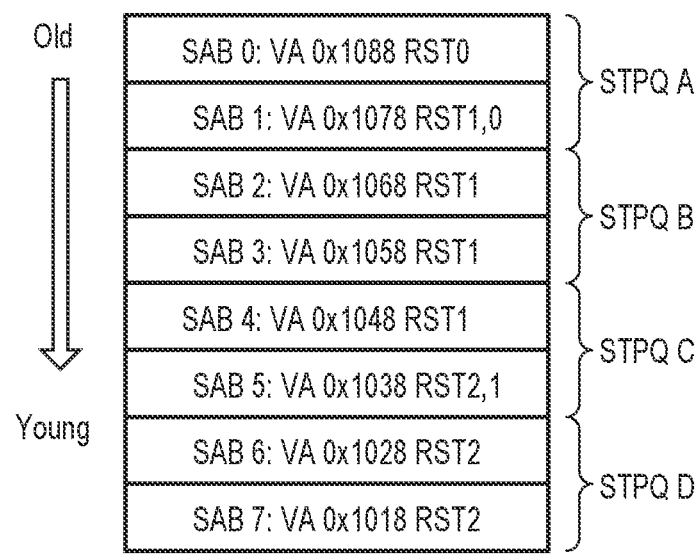
FIG. 6a schematically illustrates an ordering of store requests in a store buffer according to various examples of the present techniques.
Figure 6B:
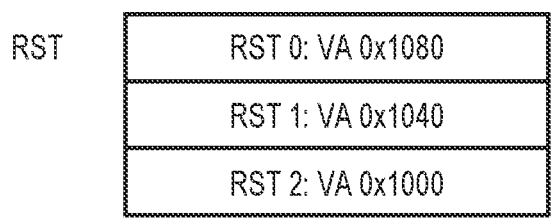
FIG. 6b schematically illustrates a set of entries in a recent store table according to various configurations of the present techniques.
Figure 6C:
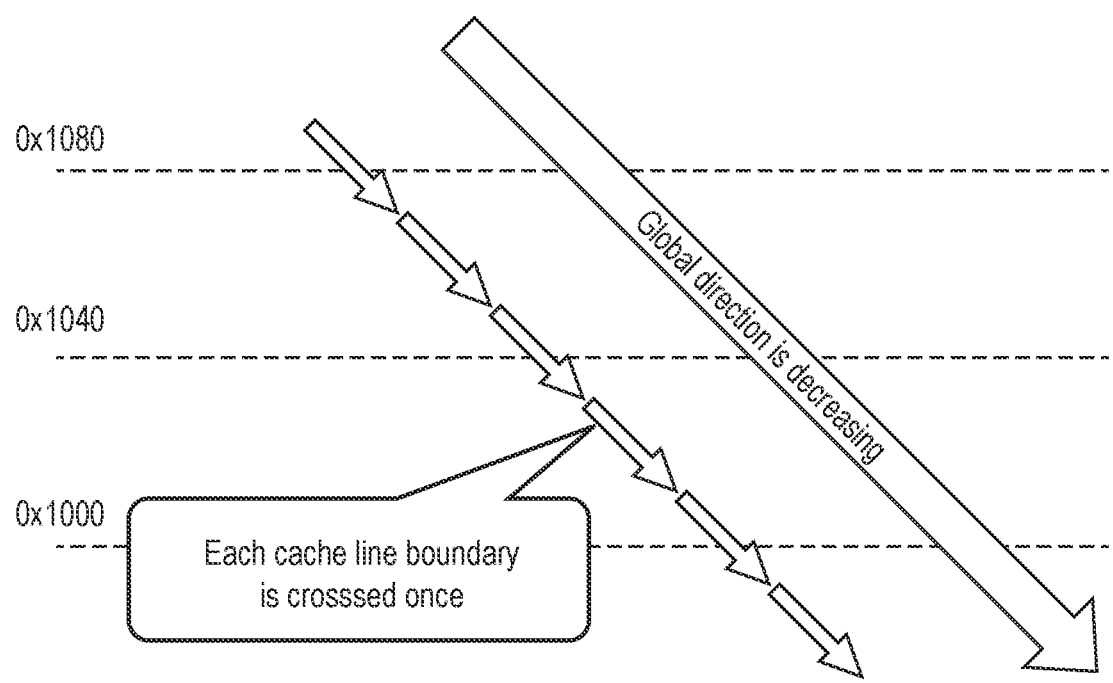

FIGS. 5a-5c, and 6a-6c schematically illustrate the effect of allocation order on the efficiency of operation of the store buffer. FIGS. 5a-5c illustrate a case in which the sequence of memory access instructions correspond to a sequence of sequentially decreasing addresses but the allocation order into the storage buffer is performed in order of increasing address. This would, for example, be the case if the present invention were not used. In contrast, FIGS. 6a-6c illustrate a case in which the sequence of memory access instructions correspond to a sequence of sequentially decreasing addresses and the allocation order into the storage buffer is, based on a copy direction hint, performed in order of decreasing address.

In FIG. 5a a sequence of memory access instructions (STPQ A, STPQ B, STPQ C, and STPQ D) are received. Each of the STPQ memory access instructions specifies N=2 data items. STPQ A identifies SAB 0 at VA (virtual address)

0x1078 and SAB 1 at VA 0x1088. STPQ B identifies SAB 2 at VA 0x1058 and SAB 3 at VA 0x1068. STPQ C identifies SAB 4 at VA 0x1038 and SAB 5 at VA 0x1048. STPQ D identifies SAB 6 at VA 0x1018 and SAB 7 at VA 0x1028. The memory access instructions are allocated to the store buffer in the order in which they are received (STPQ A to STPQ D). As illustrated, the older STPQ instructions correspond to sequentially higher virtual addresses. However, the allocation order to the store buffer for each individual STPQ instruction is performed in order of increasing virtual address. As a result, the virtual address sequence can be seen to be locally (within store requests associated with a single memory access instruction) increasing from older store requests to younger store requests but globally (between store requests associated with different memory access instructions) decreasing from older store requests to younger store requests.

In order to illustrate the population of the recent store tracking storage, the steps set out in FIG. 4 are followed. It is assumed that, as a starting point, RST entry RST 0 has been allocated but is not yet associated with any of the illustrated store buffer entries, and that SAB 0 is the current store request. Hence, at the starting point, the store buffer association is:

| Store request | Begins at virtual address | Associated with |
| --- | --- | --- |
| SAB 0 | VA 0x1078 | |
| SAB 1 | VA 0x1088 | |
| SAB 2 | VA 0x1058 | |
| SAB 3 | VA 0x1068 | |
| SAB 4 | VA 0x1038 | |
| SAB 5 | VA 0x1048 | |
| SAB 6 | VA 0x1018 | |
| SAB 7 | VA 0x1028 | |

In a first cycle (cycle 0) it is determined, at step S40, that a new instruction cycle has begun. At step S42, the tag information and the address range of store request SAB 0 (the current store request) is read. At step S44 it is determined that, all portions of SAB 0 are not associated with any entry in the RST. Flow then proceeds to step S46 where it is determined that a portion of SAB 0 is covered by an existing entry in the RST. In particular, SAB 0 begins at VA 0x1078 and continues to 0x1087 and, hence, spans cache lines 0x1040 and 0x1080. Therefore, the portion of SAB 0 from VA 0x1080 to 0x1087 is covered by the cache line identified in RST 0. Flow then proceeds to step S56 where it is determined that, in cycle 0, no pre-existing entry in the RST has been identified. Flow then proceeds to step S62 where RST 0 is identified as a pre-existing entry in the RST (for cycle 0). Flow then proceeds to step S64 where the tag information of SAB 0 is modified to indicate that the portion of SAB 0 from VA 0x1080 to 0x1087 is associated with RST 0. Flow then returns to step S44 where it is determined that there is still a portion of SAB 0 that is not associated with an entry in the RST (the portion of SAB 0 spanning the address range 0x1078 to 0x107F. Flow then proceeds to step S46 where it is determined that there is no allocated RST entry associated with the portion of SAB 0 spanning the address range 0x1078 to 0x107F Flow then proceeds to step S48 where, as no entry has been allocated during this cycle (cycle 0) flow proceeds to step S50 where RST entry RST 1 is allocated indicating the cache line beginning at 0x1040. Flow then proceeds to step S52 where the tag information of SAB 0 is modified to indicate that SAB 0 is associated with RST 1 (in addition to already being associated with RST 0.

Flow then proceeds to step S60 where the allocation circuitry waits for the next cycle. After cycle 0, the store buffer entries are associated with the RST entries as follows:

| Store request | Begins at virtual address | Associated with |
| --- | --- | --- |
| SAB 0 | VA 0x1078 | RST 1, 0 |
| SAB 1 | VA 0x1088 | |
| SAB 2 | VA 0x1058 | |
| SAB 3 | VA 0x1068 | |
| SAB 4 | VA 0x1038 | |
| SAB 5 | VA 0x1048 | |
| SAB 6 | VA 0x1018 | |
| SAB 7 | VA 0x1028 | |

During the next instruction cycle (cycle 1) SAB 0 is still the "current store request". Flow begins at step S40 and proceeds through step S42 to step S44. At step S44, it is determined that the tag information indicates that all portions of the current store (SAB 0) are associated with an entry in the RST. Flow then proceeds to step S54 where SAB 1 is considered as the next "current store request". Flow then proceeds to step S42, where the tag information of SAB 1 is read, and on to step S44 where it is determined that the tag information indicates that SAB 1 is not associated with any entries of the RST and, hence, flow proceeds to step S46. At step S46, it is determined that the address range of SAB 1 is covered by an entry of the RST. Flow therefore proceeds to step S56 where it is determined that this cycle (cycle 1) a pre-existing entry in the RST has not been identified. Flow therefore proceeds to step S62 where it is determined that the portion of SAB 1 is covered by the pre-existing entry RST 0. Flow then proceeds to step S64, where the tag information of SAB 1 is modified to indicate that SAB 1 is associated with RST 0. Flow then returns to step S44. At step S44, it is determined that all portions of SAB 1 are associated with an entry in the RST and flow proceeds to step S54 where SAB 2 is considered as the next "current store request". Flow then proceeds to step S42 where the tag information of SAB 2 is read. Flow proceeds to step S44 where it is determined that the tag information of SAB 2 indicates that it is not associated with any entry of the RST. Flow then proceeds to step S46, where it is determined that SAB 2 (spanning address range VA 0x1058 to 0x1067) is associated with RST 1. Flow then proceeds to step S56 where it is determined that a pre-existing entry in the RST has already been identified this cycle (RST 0). Flow then proceeds to step S58 where it is determined that the data block associated with SAB 2 is not covered by RST 1. Therefore, flow proceeds to step S60 where the allocation circuitry waits for the next cycle. After cycle 1, the store buffer entries are associated with the RST entries as follows:

| Store request | Begins at virtual address | Associated with |
| --- | --- | --- |
| SAB 0 | VA 0x1078 | RST 1, 0 |
| SAB 1 | VA 0x1088 | RST 0 |
| SAB 2 | VA 0x1058 | |
| SAB 3 | VA 0x1068 | |
| SAB 4 | VA 0x1038 | |
| SAB 5 | VA 0x1048 | |
| SAB 6 | VA 0x1018 | |
| SAB 7 | VA 0x1028 | |

During the next instruction cycle (cycle 2), SAB 2 is still the current store request. As described above, flow proceeds through steps S40, S42, S44, and S46 to step S56 where it is determined that no pre-existing entry in the RST has been identified this cycle. Flow therefore proceeds to step S62, where RST 1 is identified as the pre-existing entry that is associated with SAB 2. Flow then proceeds to step S64 where the tag information of SAB 2 is modified to associated SAB 2 with RST entry 1. Flow then returns to step S44 where it is determined that all portions of SAB 2 are associated with an entry in the RST. Flow therefore proceeds to step S54 where SAB 3 is considered as the next "current store request". Flow then proceeds, according to the steps set out in FIG. 4, through steps S42, S44, and S46 to step S56 where it is determined that the pre-existing entry has already been identified as RST 1. Flow then proceeds to step S58, where is determined that SAB 3 is covered by RST 1. Flow then proceeds to step S64 where the tag information associated with SAB 3 is modified to indicate that SAB 3 is associated with RST 1. Flow then proceeds to S44 and, because all portions of SAB 3 are now associated with an entry in the RST, flow proceeds to step S54, where SAB 4 is considered as the next "current store request". SAB 4 spans the VA range 0x1038 to 0x1047 and, as a result spans cache lines 0x1000 and 0x1040. Because a portion of SAB 4 is covered by RST 1 (the pre-existing entry identified in cycle 1), flow proceeds (as described for SAB 3) through steps S42, S44, S46, S56, and S58 to S64 where the tag information associated with SAB 4 is modified so that SAB 4 is associated with RST 1. Flow then proceeds to step S44. At step S44, it is determined that there is still a portion of SAB 4 that is not associated with an RST entry (the portion from VA 0x1038 to 0x1039). Flow therefore proceeds to S46 where it is determined that the portion from VA 0x1038 to 0x1039 is not associated with a current RST entry. Flow therefore proceeds to step S48 where it is determined that no new RST entries have been allocated this cycle (cycle 2). Flow then proceeds to step S50 where RST entry 2 is allocated associated with the cache line beginning at VA 0x1000. The resulting RST entries are illustrated in FIG. 5b. Flow then proceeds to step S52 where the tag information of SAB 4 is modified to indicate that SAB 4 is also associated with RST 2. Flow then proceeds to step S60 where the allocation circuitry waits for the next cycle. After cycle 2, the store buffer entries are associated with the RST entries as follows:

| Store request | Begins at virtual address | Associated with |
|---|---|---|
| SAB 0 | VA 0x1078 | RST 1, 0 |
| SAB 1 | VA 0x1088 | RST 0 |
| SAB 2 | VA 0x1058 | RST 1 |
| SAB 3 | VA 0x1068 | RST 1 |
| SAB 4 | VA 0x1038 | RST 2, 1 |
| SAB 5 | VA 0x1048 | |
| SAB 6 | VA 0x1018 | |
| SAB 7 | VA 0x1028 | |

The flow pattern through FIG. 4 for cycles 1 and 2 is then repeated for cycles 3 and 4. In cycle 3, store buffer entry SAB 5 is associated with RST entry 1. In cycle 4, store buffer entries 6, 7 and 8 (not illustrated) are associated with RST entry 2 and a new entry associated with store buffer entry 8 (not illustrated) is allocated to the RST. As a result, the allocation buffer is able to work through an average of two store buffer requests per cycle. This pattern is illustrated schematically in FIG. 5c in which the x axis represents requests within the store buffer (from oldest to youngest) and the y axis represents the virtual address at which the store request is to be stored. As can be seen, the global direction is decreasing yet the local address is increasing. The allocation of store requests to the store buffer as set out in FIG. 5a results in each cache line boundary being "crossed" twice. Optimal allocation of entries in the RST is achieved when a cache line is first allocated and then, on a subsequent cycle, all storage buffer entries that correspond to that cache line are associated with that RST entry. As is illustrated in FIG. 5c, the variation between the global and the local behaviour of the store requests means that this is not the case resulting in a sub-optimal allocation of RST entries.

FIG. 6a-6c schematically illustrate the allocation of store request into the store buffer based on various configurations of the present technique. In particular, when the copy direction hint indicates that the memory access instruction is one of a sequence of memory access instructions each indicating a corresponding store operation identifying one of a sequence of sequentially decreasing addresses.

In FIG. 6a a sequence of memory access instructions (STPQ A, STPQ B, STPQ C, and STPQ D) are received. Each of the STPQ memory access instructions specifies N=2 data items. STPQ A identifies SAB 0 at VA (virtual address) 0x1088 and SAB 1 at VA 0x1078. STPQ B identifies SAB 2 at VA 0x1068 and SAB 3 at VA 0x1058. STPQ C identifies SAB 4 at VA 0x1048 and SAB 5 at VA 0x1038. STPQ D identifies SAB 6 at VA 0x1028 and SAB 7 at VA 0x1018. The memory access instructions are allocated to the store buffer in the order in which they are received (STPQ A to STPQ D). As illustrated, the older STPQ instructions correspond to sequentially higher virtual addresses. In addition, the copy direction hint indicates that the memory access instruction is one of the sequence of memory access instructions each indicating a corresponding store operation identifying one of a sequence of sequentially decreasing addresses. As a result, the allocation order to the store buffer for each individual STPQ instruction is performed in order of decreasing virtual address, and the virtual address sequence can be seen to be both locally (within store requests associated with a single memory access instruction) and globally (between store requests associated with different memory access instructions) decreasing from older store requests to younger store requests.

In order to illustrate the population of the recent store tracking storage, the steps set out in FIG. 4 are followed. It is assumed that, as a starting point, RST entry RST 0 has been allocated but is not yet associated with any of the illustrated store buffer entries, and that SAB 0 is the current store request. Hence, at the starting point, the store buffer association is:

| Store request | Begins at virtual address | Associated with |
|---|---|---|
| SAB 0 | VA 0x1088 | |
| SAB 1 | VA 0x1078 | |
| SAB 2 | VA 0x1068 | |
| SAB 3 | VA 0x1058 | |
| SAB 4 | VA 0x1048 | |
| SAB 5 | VA 0x1038 | |
| SAB 6 | VA 0x1028 | |
| SAB 7 | VA 0x1018 | |

In a first cycle (cycle 0) it is determined, at step S40, that a new instruction cycle has begun. At step S42, the tag information and the address range of store request SAB 0 (the current store request) is read. At step S44 it is determined that, all portions of SAB 0 are not associated with any entry in the RST. Flow then proceeds to step S46 where it is determined that a portion of SAB 0 is covered by an existing entry in the RST. In particular, SAB 0 begins at VA 0x1088 and continues to 0x1097. Therefore, all portions of SAB 0 fall within a same cache line (the cache line beginning at 0x1080). Flow then proceeds to step S56 where it is determined that, in cycle 0, no pre-existing entry in the RST has been identified. Flow then proceeds to step S62 where RST 0 is identified as a pre-existing entry in the RST. Flow then proceeds to step S64 where the tag information of SAB 0 is modified to indicate that SAB 0 is associated with RST 0. Flow then returns to step S44 where it is determined that there are no portions of SAB 0 that are not associated with an entry in the RST. Flow then proceeds to step S54 where SAB 1 is considered as the next "current store request". SAB 1 spans from address 0x1078 to 0x1087 and therefore spans two cache lines (the cache line associated with RST 0 that begins at 0x1080 and a cache line that begins at 0x1040). At step S46 it is determined that a portion of SAB 1 is associated with an existing entry of the RST (VA 0x1080 to 0x1087 are associated with entry RST 0). Flow then proceeds to step S56 where it is determined that the pre-existing entry for this cycle (cycle 0) has already been identified as RST 0. Flow therefore proceeds to step S58 where it is determined that the pre-existing entry corresponds to the non-associated portion. Therefore flow proceeds to step S64 where the tag information for SAB 1 is modified to indicate that SAB 1 is associated with RST 0. Flow then returns to step S44. As there is still a portion of SAB 1 to associated with an entry (the portion of SAB 1 that spans from 0x1078 to 0x107F), which also does not correspond to any pre-existing RST entry, flow proceeds through steps S44 and S46 to step S48. As no entry has been allocated this cycle, flow proceeds to step S50 where a new entry (RST 1) is allocated in the recent store tracing storage. Flow then proceeds to step S52 where the tag information that is associated with SAB 1 is modified to indicate that SAB 1 is associated with the entry RST 1. Flow then proceeds to step S60 where the allocation circuitry waits for the next cycle. After cycle 0, the store buffer entries are associated with the RST entries as follows:

| Store request | Begins at virtual address | Associated with |
| --- | --- | --- |
| SAB 0 | VA 0x1088 | RST 0 |
| SAB 1 | VA 0x1078 | RST 1, 0 |
| SAB 2 | VA 0x1068 | |
| SAB 3 | VA 0x1058 | |
| SAB 4 | VA 0x1048 | |
| SAB 5 | VA 0x1038 | |
| SAB 6 | VA 0x1028 | |
| SAB 7 | VA 0x1018 | |

In cycle 1 flow begins at step S40 with SAB 1 as the current store request. Flow proceeds through steps S42 and S44 where it is determined that all portions associated with SAB 1 are now associated with an RST entry. Flow then arrives at step S54 where SAB 2 is considered as a next "current store request". Following the flow path from S54 through S42, S44, S46, S56, S58, S64, S44 and back to S54, RST 1 is identified as the pre-existing entry in the RST and SAB 2 is associated with RST 1. Using a similar sequence (from S54 through S42, S44, S46, S56, S62, and S64, each of SAB 3, SAB 4, and the portion of SAB 5 from VA 0x1040 to 0x1047 are associated with RST 1. Flow then proceeds to step S44 where it is determined that there is still a portion of SAB 5 that has not been associated with an RST entry. At this point, no RST entry has been allocated this cycle. Hence, flow proceeds from S44, through S46 and S48 to S50 where a new entry is allocated in the RST (RST entry 2 referring to cache line VA 0x1000). The resulting RST entries are illustrated in FIG. 6b. Flow then proceeds to step S52 where the tag information associated with SAB 5 is modified to associated SAB 5 with RST 2. Flow then proceeds to step S60 where the allocation circuitry waits for the next cycle. After cycle 1, the store buffer entries are associated with the RST entries as follows:

| Store request | Begins at virtual address | Associated with |
| --- | --- | --- |
| SAB 0 | VA 0x1088 | RST 0 |
| SAB 1 | VA 0x1078 | RST 1, 0 |
| SAB 2 | VA 0x1068 | RST 1 |
| SAB 3 | VA 0x1058 | RST 1 |
| SAB 4 | VA 0x1048 | RST 1 |
| SAB 5 | VA 0x1038 | RST 2, 1 |
| SAB 6 | VA 0x1028 | |
| SAB 7 | VA 0x1018 | |

This pattern is then repeated in cycle 2 with entries 5, 6, 7, and 8 (not illustrated) are each associated with a RST entries. As a result, 4 store requests from the store buffer are allocated each cycle. In other words, by modifying the allocation order in view of the store direction hint, the number of store buffer entries that are associated with a recent store tracking storage entry per cycle is doubled. This pattern is illustrated schematically in FIG. 6c in which the x axis represents requests within the store buffer (from oldest to youngest) and the y axis represents the virtual address at which the store request is to be stored. As can be seen, the global direction is decreasing and the local direction is also decreasing. The allocation of store requests to the store buffer as set out in FIG. 6a results in each cache line boundary being "crossed" only once. In contrast to the allocation order illustrated in FIG. 5c, entries in the RST are first allocated in once cycle and then, in a subsequent cycle, all store requests that are associated with that entry are associated with the RST entry.

One example of a memory access instruction is a high level memory copy instruction that may be realized by a plurality of architectural instructions instead of single instruction. An example of such a plurality of instructions is the use of three instructions to implement a high level memory copy instruction. These instructions include a prologue memory copy instruction, a main body memory copy instruction, and an epilogue memory copy instruction. One possible implementation of these three instructions could be to copy small amount of (potentially non-aligned) bytes using the prologue memory copy instruction to enforce address alignment for subsequent memory copy instructions. The processing circuitry may then iterate for both main body memory copy instructions and epilogue memory copy instructions. In a high level forward memory copy instruction the main body memory copy instruction may copy the majority of data with larger granularity and the epilogue memory copy instruction is used to copy remaining data potentially of smaller granularity. To maximise most common forward copy performance, a backward copy may not be supported using the main body memory copy instruction. In such a case, epilogue memory copy instructions may be used to copy a majority of the copy data. As a result, on a micro-architectural level, the prediction circuitry is able to obtain an indication as to whether a copy sequence is a forward copy sequence or a backward copy sequence based on the number of epilogue memory copy instructions that are observed. It would be readily apparent to the person having ordinary skill in the art that a similar plurality of architectural instructions could be provided for any high level memory access operation, for example, a high level memory move instruction.

Figure 7:
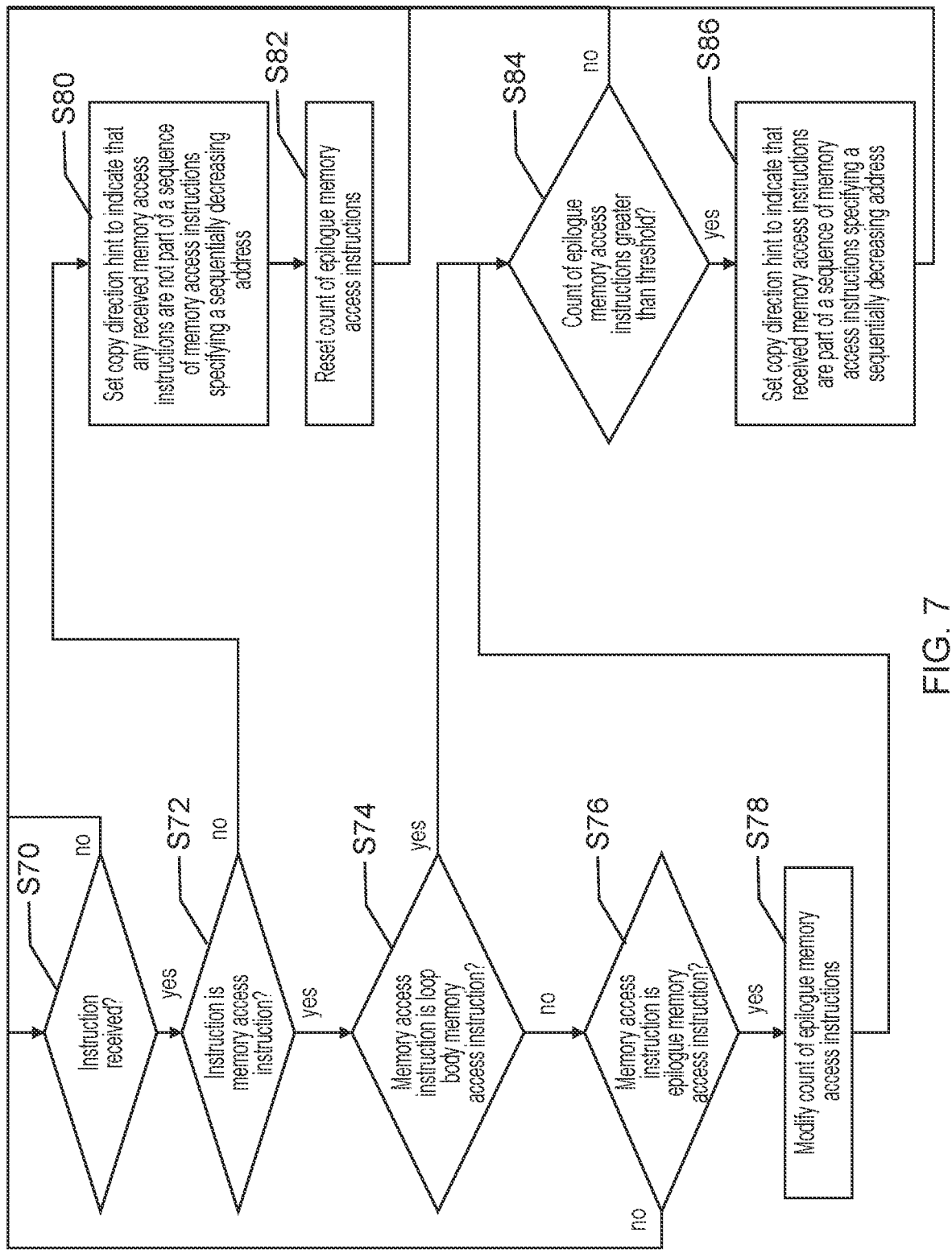
FIG. 7 schematically illustrates a sequence of steps carried out by an apparatus according to various configurations of the present techniques.

FIG. 7 schematically illustrates a sequence of steps carried out by the prediction circuitry to maintain such a count of epilogue instructions, in order to set the copy direction hint. Flow begins at step S70 where it is determined if an instruction has been received. If no then flow remains at step S70. If, at step S70, it is determined that an instruction is received then flow proceeds to step S72 where it is determined if the instruction is a memory access instruction. If, at step S72, it is determined that the instruction is not a memory access instruction, then flow proceeds to step S80 At step S80, the copy hint is set (modified) to indicate that any received memory access instructions are not part of a sequence of memory access instructions specifying a sequentially decreasing address. Flow then proceeds to step S82 where the count of epilogue memory access instructions are reset before flow returns to step S70.

If, at step S72, it was determined that the instruction is a memory access instruction then flow proceeds to step S74. At step S74, it is determined whether the memory access is a loop body memory access instruction. If, at step S74, it is determined that the memory access instruction is a loop body memory access instruction, then flow proceeds to step S84. At step S84, it is determined whether the count of epilogue memory access instructions is greater than a threshold. If, at step S84, it is determined that the count of epilogue instructions is not higher than the threshold then flow returns to step S70. If, at step S84, it is determined that the count of epilogue memory access instructions is greater than a threshold, then flow proceeds to step S86. At step S86, the copy direction hint is set to indicate that the received memory access instructions are part of a sequence of memory access instructions specifying sequentially decreasing addresses. Flow then returns to step S70.

If, at step S74, it was determined that the memory access instruction is not a loop body memory access instruction, then flow proceeds to step S76. At step S76, it is determined whether the memory access instruction is an epilogue memory access instruction. If, at step S76, it is determined that the memory access instruction is not an epilogue memory access instruction, then flow returns to step S70. If, at step S76, it is determined that the memory access instruction is an epilogue memory access instruction then flow proceeds to step S78. At step S78, the count of epilogue memory access instructions is modified to indicate the occurrence of the epilogue memory access instruction. Flow then proceeds to step S84 and proceeds as described above.

Figure 8:
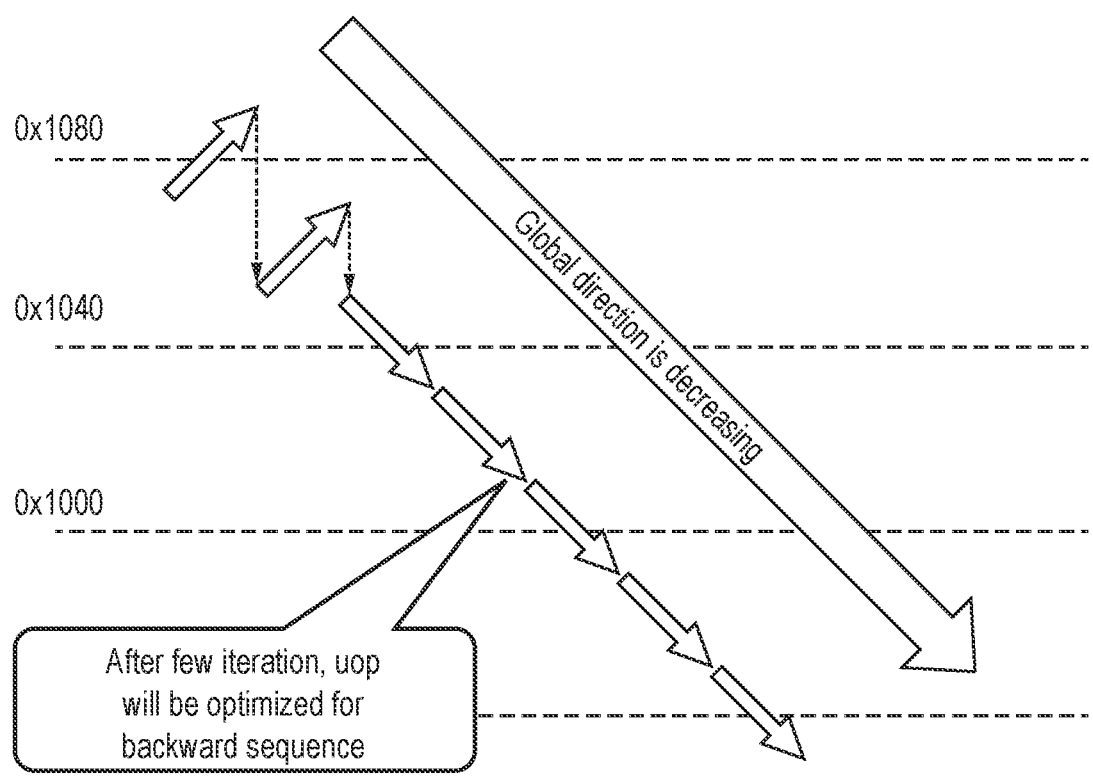
FIG. 8 schematically illustrates a direction of changes in memory access associated with the store request according to various configurations of the present techniques.

FIG. 8 schematically illustrates a result of detecting a copy loop direction hint based on an observed sequence of memory access requests. In the illustrated example, the threshold is set to two sequential epilogue memory access instructions. Hence, the allocation circuitry initially associates the RST entries as set out in the example of FIG. 5c. However, once two iterations of the sequence have been carried out, the allocation count of the epilogue instructions exceeds the threshold and the prediction circuitry sets the copy direction hint to indicate that the copy instructions are likely to be associated with a sequence of memory access instructions each indicating a corresponding store operation identifying one of a sequence of sequentially decreasing addresses. Once the copy direction hint is set to indicate that the memory access instruction is one of a sequence of memory access instructions each indicating a corresponding store operation identifying one of a sequence of sequentially decreasing addresses, the address allocation circuitry begins setting the address allocation can be seen to be both locally (within store requests associated with a single memory access instruction) and globally (between store requests associated with different memory access instructions) decreasing from older store requests to younger store requests.

Figure 9:
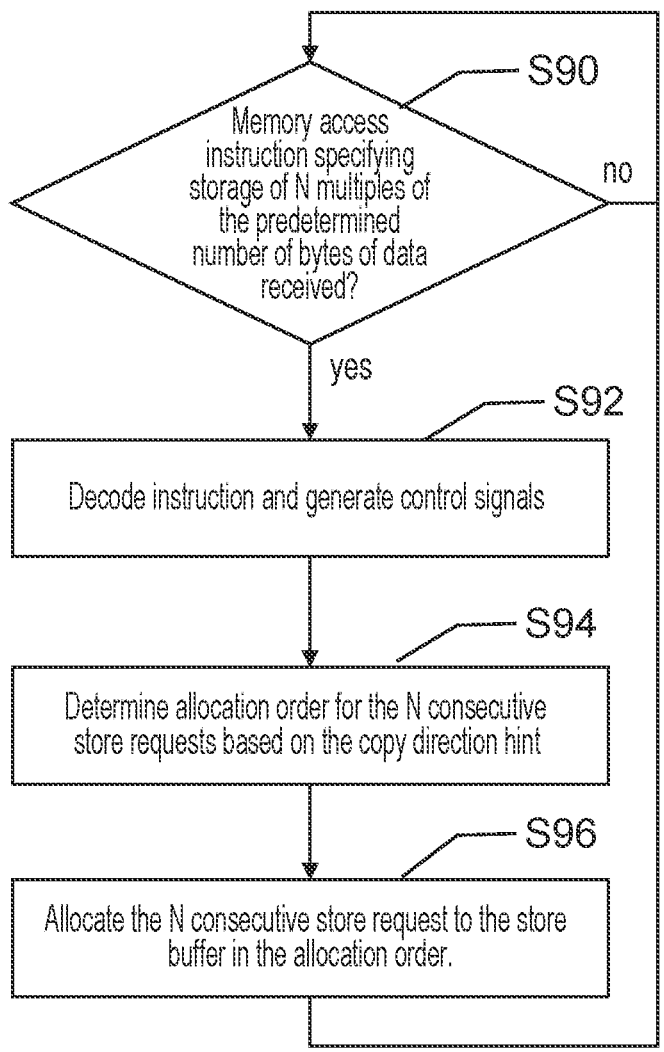
FIG. 9 schematically illustrates a sequence of steps carried out by an apparatus according to various configurations of the present techniques.

FIG. 9 schematically illustrates a sequence of steps carried out by an apparatus in accordance with various configurations of the present techniques. Flow begins at step S90, where it is determined whether a memory access instruction specifying storage of N multiples of the predetermined number of bytes of data has been received. If no then flow remains at step S90. If, at step S90, it is determined that a memory access instruction specifying storage of N multiples of the predetermined number of bytes of data has been received, then flow proceeds to step S92. At step S92 the instruction is decoded and control signals are generated before flow proceeds to step S94. At step S94, the allocation circuitry is responsive to the control signals to determine an allocation order for N consecutive store requests (one for each of the N multiples of the predetermined number of bytes of data) based on the copy direction hint before flow proceeds to step S96. At step S96, the N consecutive store requests are allocated to the store buffer in the allocation order before flow returns to step S90.

Figure 10:
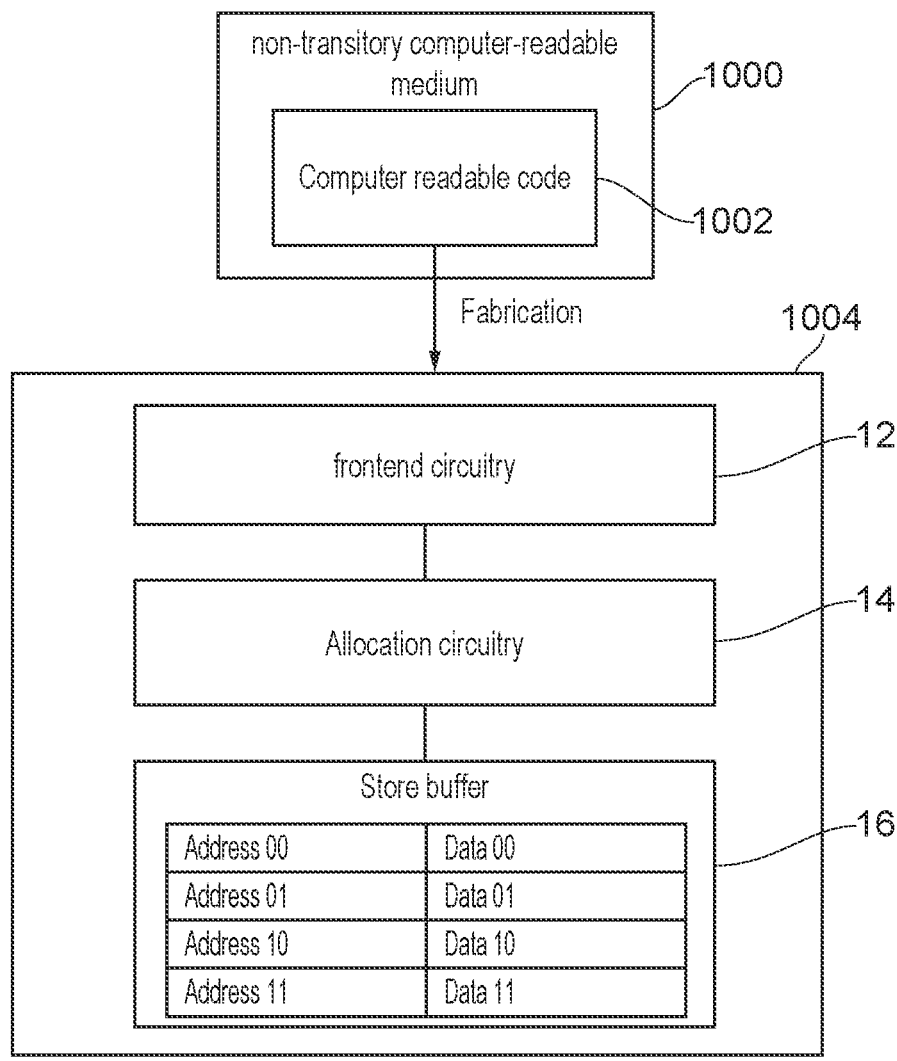
FIG. 10 schematically illustrates fabrication of an apparatus according to various configurations of the present techniques.

FIG. 10 schematically illustrates a non-transitory computer-readable medium comprising computer readable code for fabrication of a data processing apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. By way of example, the fabricated design 1004 may comprise the apparatus illustrated in FIG. 1 incorporating frontend circuitry 12, allocation circuitry 14, and a store buffer 16. However, the fabricated design may correspond to any of the circuits described in FIGS. 1-3, configured to perform the steps described in relation to FIGS. 4-9.

In brief overall summary there is provided an apparatus, method and medium. The apparatus comprises a store buffer to store a plurality of store requests, where each of the plurality of store requests identifies a storage address and a data item to be transferred to storage beginning at the storage address, where the data item comprises a predetermined number of bytes. The apparatus is responsive to a memory access instruction indicating a store operation specifying storage of N data items, to determine an address allocation order of N consecutive store requests based on a copy direction hint indicative of whether the memory access instruction is one of a sequence of memory access instructions each identifying one of a sequence of sequentially decreasing addresses, and to allocate the N consecutive store requests to the store buffer in the address allocation order.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Particular configurations may also be provided according to the following numbered clauses:

Clause 1. An apparatus comprising:
a store buffer configured to store a plurality of store requests, each of the plurality of store requests identifying a storage address and a data item to be transferred to storage beginning at the storage address, wherein the data item comprises a predetermined number of bytes;
frontend circuitry responsive to a memory access instruction indicating a store operation specifying storage of N data items, to generate control signals;
allocation circuitry, responsive to the control signals, to determine an address allocation order of N consecutive store requests in the store buffer based on a copy direction hint indicative of whether the memory access instruction is one of a sequence of memory access instructions each indicating a corresponding store operation identifying one of a sequence of sequentially decreasing addresses, and to allocate the N consecutive store requests to the store buffer in the address allocation order, wherein each of the N consecutive store requests is indicative of one of the N data items.

Clause 2. The apparatus of clause 1, wherein when the copy direction hint indicates that the memory access instruction is one of the sequence of memory access instructions each specifying one of the sequence of sequentially decreasing addresses, the address allocation order is monotonically decreasing.

Clause 3. The apparatus of clause 1 or clause 2, wherein when the copy direction hint indicates that the memory access instruction is not one of the sequence of memory access instructions each specifying one of the sequence of sequentially decreasing addresses, the address allocation order is monotonically increasing.

Clause 4. The apparatus of any preceding clause, wherein the copy direction hint is included in the memory access instruction.

Clause 5. The apparatus of any of clauses 1 to 3, wherein
the apparatus comprises hint flag storage configured to store the copy direction hint
the frontend circuitry is responsive to a hint instruction encoding information indicative of a specified copy direction hint to generate hint update control signals; and the allocation circuitry is responsive to the hint update control signals to update the hint flag storage to the specified copy direction hint.

Clause 6. The apparatus of any of clauses 1 to 3, wherein:
the apparatus comprises hint flag storage configured to store the copy direction hint; and
the apparatus comprises predictor circuitry configured to update the copy direction hint based on one or more properties of the sequence of memory access instructions.

Clause 7. The apparatus of clause 6, wherein:
the frontend circuitry is responsive to a plurality of types of memory access instruction; and
the predictor circuitry is configured to maintain, as the one or more properties of the sequence of memory access instructions an observed distribution of at least one of the plurality of types of memory access instructions.

Clause 8. The apparatus of clause 7, wherein:
the plurality of types of memory access instruction are suitable for performing an iterated sequence of memory accesses to a contiguous region of memory;
the plurality of types of memory access instruction comprise a loop body memory access instruction arranged to access a complete region of the N data blocks, and an epilogue memory access instruction arranged to access an incomplete region of the N data blocks; and
the allocation circuitry is configured to maintain, as the observed distribution, epilogue memory access information indicative of occurrences of the epilogue memory access instruction.

Clause 9. The apparatus of clause 7, wherein the allocation circuitry is responsive to the epilogue memory access information indicating that the occurrences of the epilogue memory access instruction has reached a predetermined threshold, to modify the copy direction hint to indicate that the memory access instruction is one of the sequence of memory access instructions each identifying one of the sequence of sequentially decreasing addresses.

Clause 10. The apparatus of clause 8 or clause 9, wherein the allocation circuitry is responsive to a break in the consecutive sequence of memory access instructions, to modify the copy direction hint to indicate that the memory access instruction is not one of the sequence of memory access instructions each specifying one of the sequence of sequentially decreasing addresses.

Clause 11. The apparatus of any preceding clause, comprising recent store tracking storage configured to store one or more entries, each of the one or more entries indicating at least one data block to be transferred to storage in response to the plurality of store requests, wherein each of the plurality of store requests is associated with at least one of the one or more entries.

Clause 12. The apparatus of clause 11, wherein each of the plurality of store requests comprises tag information indicative of at least one associated entry of the one or more entries.

Clause 13. The apparatus of clause 12, wherein the allocation circuitry is configured, for a given instruction cycle and for a non-associated store request identifying a corresponding address and having tag information indicating that the corresponding address is not associated with any of the one or more entries, to allocate a new entry in the recent store tracking storage indicating a new data block corresponding to at least a portion of bytes of data identified by the corresponding address, and to modify the tag information of the non-associated store request to associate the non-associated store request with the new entry.

Clause 14. The apparatus of clause 13, wherein the allocation circuitry is configured, for the given instruction cycle and for a pre-existing entry of the one or more entries, to modify the tag information of each store request of the plurality of store requests having a corresponding storage address that identifies data within a same data block as the pre-existing store request to associate that store request with the pre-existing entry.

Clause 15. The apparatus of any of clauses 11 to 14, wherein the allocation circuitry is configured to sequentially deallocate each entry of the one or more entries and to transfer at least one data block indicated in that entry to storage.

Clause 16. The apparatus of clause 15, wherein the allocation circuitry is arranged, when deallocating each entry of the one or more entries, to deallocate each store request of the plurality of store requests associated with that entry.

Clause 17. The apparatus of any of clause 15 or 16, wherein the storage is a memory hierarchy.

Clause 18. The apparatus of any of clauses 11 to 17, wherein the data block is a cache line.

We claim:

1. An apparatus comprising:
   a store buffer configured to store a plurality of store requests, each of the plurality of store requests identifying a storage address and a data item to be transferred to storage beginning at the storage address, wherein the data item comprises a predetermined number of bytes;
   frontend circuitry responsive to a memory access instruction indicating a store operation specifying storage of N data items, to generate control signals;
   allocation circuitry, responsive to the control signals, to determine an address allocation order of N consecutive store requests in the store buffer based on a copy direction hint indicative of whether the memory access instruction is one of a sequence of memory access instructions each indicating a corresponding store operation identifying one of a sequence of sequentially decreasing addresses, and to allocate the N consecutive store requests to the store buffer in the address allocation order, wherein each of the N consecutive store requests is indicative of one of the N data items.

2. The apparatus of claim 1, wherein when the copy direction hint indicates that the memory access instruction is one of the sequence of memory access instructions each specifying one of the sequence of sequentially decreasing addresses, the address allocation order is monotonically decreasing.

3. The apparatus of claim 1, wherein when the copy direction hint indicates that the memory access instruction is not one of the sequence of memory access instructions each specifying one of the sequence of sequentially decreasing addresses, the address allocation order is monotonically increasing.

4. The apparatus of any claim 1, wherein the copy direction hint is included in the memory access instruction.

5. The apparatus of claim 1, wherein
   the apparatus comprises hint flag storage configured to store the copy direction hint;
   the frontend circuitry is responsive to a hint instruction encoding information indicative of a specified copy direction hint to generate hint update control signals; and
   the allocation circuitry is responsive to the hint update control signals to update the hint flag storage to the specified copy direction hint.

6. The apparatus of claim 1, wherein:
   the apparatus comprises hint flag storage configured to store the copy direction hint; and
   the apparatus comprises predictor circuitry configured to update the copy direction hint based on one or more properties of the sequence of memory access instructions.

7. The apparatus of claim 6, wherein:
   the frontend circuitry is responsive to a plurality of types of memory access instruction; and
   the predictor circuitry is configured to maintain, as the one or more properties of the sequence of memory access instructions an observed distribution of at least one of the plurality of types of memory access instructions.

8. The apparatus of claim 7, wherein:
   the plurality of types of memory access instruction are suitable for performing an iterated sequence of memory accesses to a contiguous region of memory;
   the plurality of types of memory access instruction comprise a loop body memory access instruction arranged to access a complete region of the N data blocks, and an epilogue memory access instruction arranged to access an incomplete region of the N data blocks; and
   the allocation circuitry is configured to maintain, as the observed distribution, epilogue memory access information indicative of occurrences of the epilogue memory access instruction.

9. The apparatus of claim 8, wherein the allocation circuitry is responsive to a break in the consecutive sequence of memory access instructions, to modify the copy direction hint to indicate that the memory access instruction is not one of the sequence of memory access instructions each specifying one of the sequence of sequentially decreasing addresses.

10. The apparatus of claim 7, wherein the allocation circuitry is responsive to the epilogue memory access information indicating that the occurrences of the epilogue memory access instruction has reached a predetermined threshold, to modify the copy direction hint to indicate that the memory access instruction is one of the sequence of memory access instructions each identifying one of the sequence of sequentially decreasing addresses.

11. The apparatus of claim 1, comprising recent store tracking storage configured to store one or more entries, each of the one or more entries indicating at least one data block to be transferred to storage in response to the plurality of store requests, wherein each of the plurality of store requests is associated with at least one of the one or more entries.

12. The apparatus of claim 11, wherein each of the plurality of store requests comprises tag information indicative of at least one associated entry of the one or more entries.

13. The apparatus of claim 12, wherein the allocation circuitry is configured, for a given instruction cycle and for a non-associated store request identifying a corresponding address and having tag information indicating that the corresponding address is not associated with any of the one or more entries, to allocate a new entry in the recent store tracking storage indicating a new data block corresponding to at least a portion of bytes of data identified by the corresponding address, and to modify the tag information of the non-associated store request to associate the non-associated store request with the new entry.

14. The apparatus of claim 13, wherein the allocation circuitry is configured, for the given instruction cycle and for a pre-existing entry of the one or more entries, to modify the tag information of each store request of the plurality of store requests having a corresponding storage address that identifies data within a same data block as the pre-existing store request to associate that store request with the pre-existing entry.

15. The apparatus of claim 11, wherein the allocation circuitry is configured to sequentially deallocate each entry of the one or more entries and to transfer at least one data block indicated in that entry to storage.

16. The apparatus of claim 15, wherein the allocation circuitry is arranged, when deallocating each entry of the one or more entries, to deallocate each store request of the plurality of store requests associated with that entry.

17. The apparatus of claim 15, wherein the storage is a memory hierarchy.

18. The apparatus of claim 11, wherein the data block is a cache line.

19. A method of operating an apparatus comprising a store buffer to store a plurality of store requests, each of the plurality of store requests identifying a storage address and a data item to be transferred for storage beginning at the storage address, wherein the data item comprises a predetermined number of bytes, the method comprising:

decoding a memory access instruction indicating a store operation specifying storage of N data items, to generate control signals;

determining, in response to the control signals, an address allocation order of N consecutive store requests in the store buffer based on a copy direction hint indicative of whether the memory access instruction is one of a sequence of memory access instructions each identifying one of a sequence of sequentially decreasing addresses; and allocating the N consecutive store requests to the store buffer in the address allocation order, wherein each of the N consecutive store request is indicative of one of the N data items.

20. A non-transitory computer readable storage medium to store computer-readable code for fabrication of an apparatus comprising:

a store buffer configured to store a plurality of store requests, each of the plurality of store requests identifying a storage address and a data item to be transferred for storage beginning at the storage address, wherein the data item comprises a predetermined number of bytes;

frontend circuitry responsive to a memory access instruction indicating a store operation specifying storage of N data items, to generate control signals;

allocation circuitry, responsive to the control signals, to determine an address allocation order of N consecutive store requests in the store buffer based on a copy direction hint indicative of whether the memory access instruction is one of a sequence of memory access instructions each identifying one of a sequence of sequentially decreasing addresses, and to allocate the N consecutive store requests to the store buffer in the address allocation order, wherein each of the N consecutive store request is indicative of one of the N data items.

\* \* \* \* \*